Nov. 23, 1926. 1,608,458
A. R. BARBIERS
VEHICLE TOP CONSTRUCTION
Filed Oct. 7, 1925
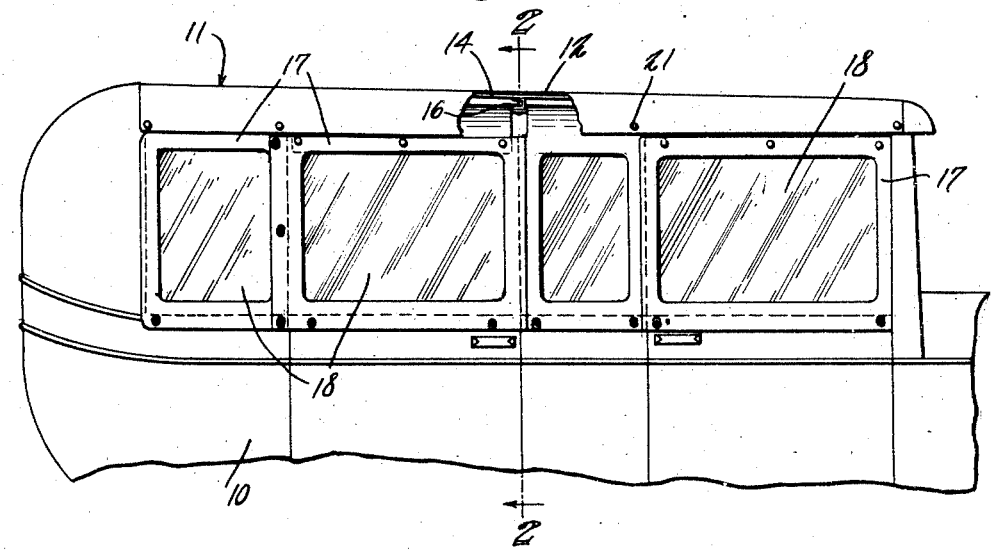
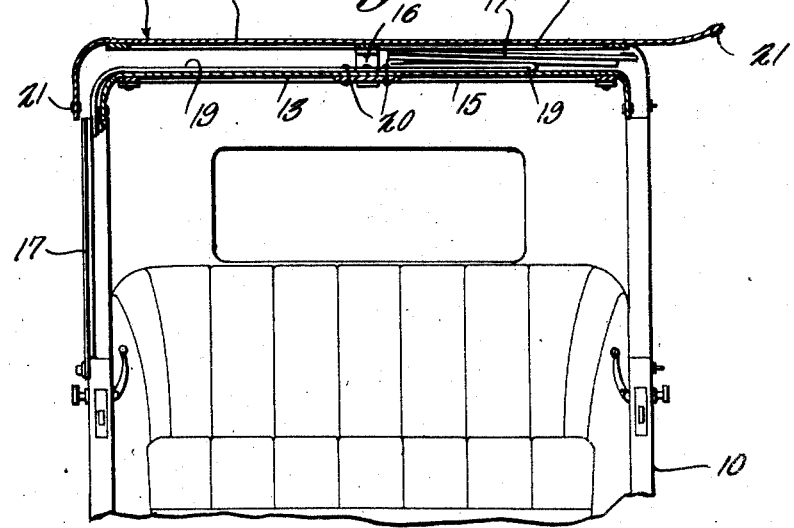
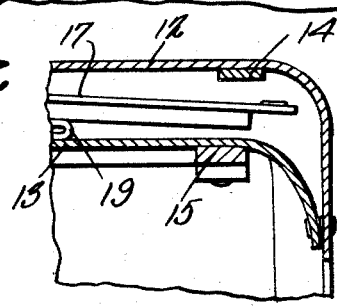

Patented Nov. 23, 1926.

1,608,458

UNITED STATES PATENT OFFICE.

ARTHUR R. BARBIERS, OF OSCEOLA, ARKANSAS, ASSIGNOR OF ONE-HALF TO RICHARD C. ROSE, OF OSCEOLA, ARKANSAS.

VEHICLE TOP CONSTRUCTION.

Application filed October 7, 1925. Serial No. 61,068.

This invention relates to improvements in mountings for glass side curtains within permanent automobile tops of the type commonly known as California tops.

An object of my invention is the provision of a frame construction arranged between the bottom and top layers of the permanent top in insuring a desired space therebetween within which the side curtains, having lights of glass, may be readily and easily slid therebetween and upon the opposite sides of the top in an out of the way position.

Another object of my invention is the provision of snap fasteners arranged upon the side edges of the lower and bottom portions of the top which are fastened together after the side curtains have been so placed therebetween.

A further object of my invention resides in the construction and arrangement of the flap, which when folded upon itself, when the windows are positioned within the top, forms a cushion for the window, thus preventing any breakage incident to jars and bumps experienced by the vehicle during transit.

With the above and other objects in view, the invention further includes the following novel features and details of construction, to be hereinafter more fully described, illustrated in the accompanying drawing and pointed out in the appended claim.

In the drawing:—

Figure 1 is a fragmentary side elevation of an automobile showing the side curtains arranged in position thereupon.

Figure 2 is a vertical sectional view taken on line 2—2 of Figure 1.

Figure 3 is a fragmentary sectional view taken through one side of the top and illustrating the manner in which the curtains may be positioned therebetween and the side edges of the lower and bottom portions of the top may be associated.

Referring to the drawing in detail, wherein like characters of reference denote corresponding parts, the reference character 10 indicates a fragmentary portion of an automobile having a permanent top 11, commonly known as the California top, including upper and lower spaced layers 12 and 13, respectively, being held and spaced apart by frames 14 and 15, respectively, arranged upon their undersides and having their intermediate portions secured to a bracket 16 whereby the desired space between the layers 12 and 13 may be assured. Both layers 12 and 13 are preferably formed of some waterproof and pliable material in order that the respective side edges thereof may be moved and arranged into the position, as clearly illustrated in Figures 2 and 3 respectively, in arranging and withdrawing the side curtains when desired.

It is my cardinal purpose and intention in constituting this invention to provide means for completely housing side curtains having plates of glass as the window light and in the accomplishment thereof I provide relatively rigid window frames 17 for mounting the panes of glass as indicated at 18 forming the window light therein. The frames 17 are provided with pliable strips, as indicated at 19, secured to their upper edges, while the opposite free ends of the strips 19 are folded upon themselves and secured as at 20 to the bottom layer 13 and the corresponding frame 15 whereby the strips 19 will be moved downwardly when the frames 17 are lowered to their operative position; thus the space between the layers 12 and 13 will be closed so as to prevent the entrance of drafts through the top of the automobile.

It is thus to be noted from the foregoing description and accompanying drawing that when the window frames 17 are thus arranged within the top 11 between the layers 12 and 13 that the corresponding side edges of the layers 12 and 13 may be secured together through the instrumentality of suitable fastening elements in the form of snap fasteners as indicated at 21 whereby the curtain will be confined in a space free from dust and moisture and the respective layers 12 and 13 will remain in their normal positions in obliterating any access of air therebetween.

It is also to be noted that the strips 19 may be disengaged from the upper edges of the frames when it is desired to open the doors upon which the frames 17 are mounted and may be again secured upon closing the doors.

The invention is susceptible of various changes in its form, proportions and minor details of construction, and the right is herein reserved to make such changes as properly fall within the scope of the appended claim.

Having described my invention what is claimed is:—

A vehicle top of the character described comprising upper and lower layers, supporting frames disposed beneath each of said layers, a supporting and spacing bracket carried by said frames for assuring a space between said layers, glassed frames positioned within the space defined between the layers, flaps arranged within the top and having their respective ends secured to one of the supporting frames and to the upper edges of the glassed frames and when folded upon themselves forming cushions for the glassed frames, and fastening means provided upon the adjacent and corresponding side edges of the layers for completely enclosing the flaps and glassed frames when positioned within the space defined between the respective layers.

In testimony whereof I affix my signature.

ARTHUR R. BARBIERS.